Oct. 8, 1968  O. J. MUNZ  3,405,213
METHOD FOR THREE-DIMENSIONAL IMPRINTING A THERMOPLASTIC OBJECT
Filed Jan. 30, 1956  4 Sheets-Sheet 1
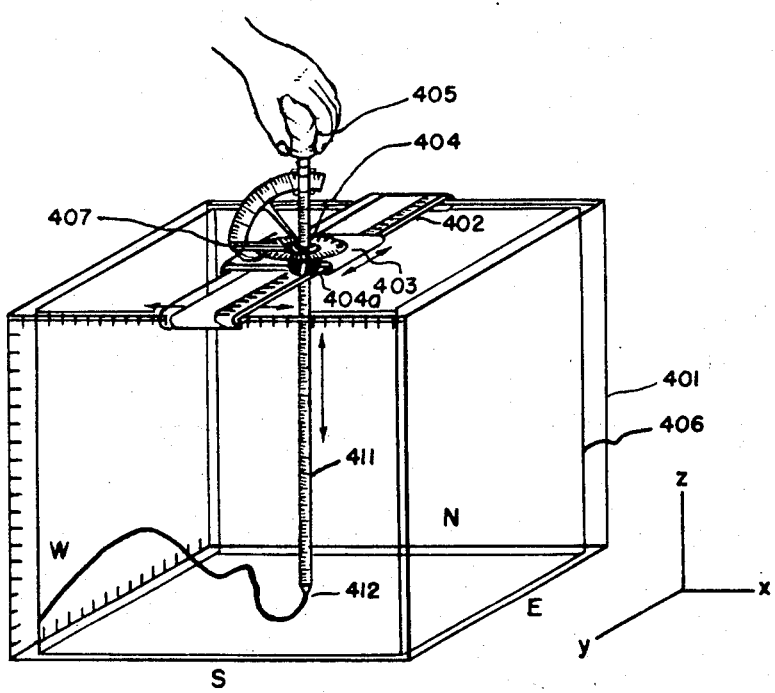
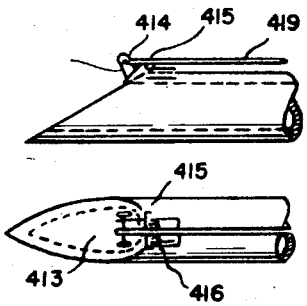
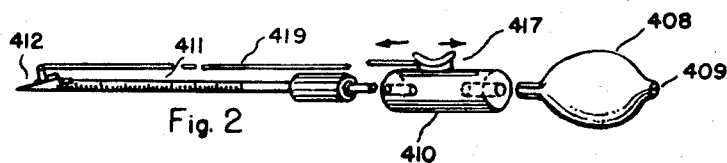
Inventor
Otto John Munz Oct. 8, 1968   O. J. MUNZ   3,405,213
METHOD FOR THREE-DIMENSIONAL IMPRINTING A THERMOPLASTIC OBJECT
Filed Jan. 30, 1956   4 Sheets-Sheet 2

Inventor
Otto John Munz

Oct. 8, 1968  O. J. MUNZ  3,405,213
METHOD FOR THREE-DIMENSIONAL IMPRINTING A THERMOPLASTIC OBJECT
Filed Jan. 30, 1956  4 Sheets-Sheet 3

INVENTOR
Otto John Munz.

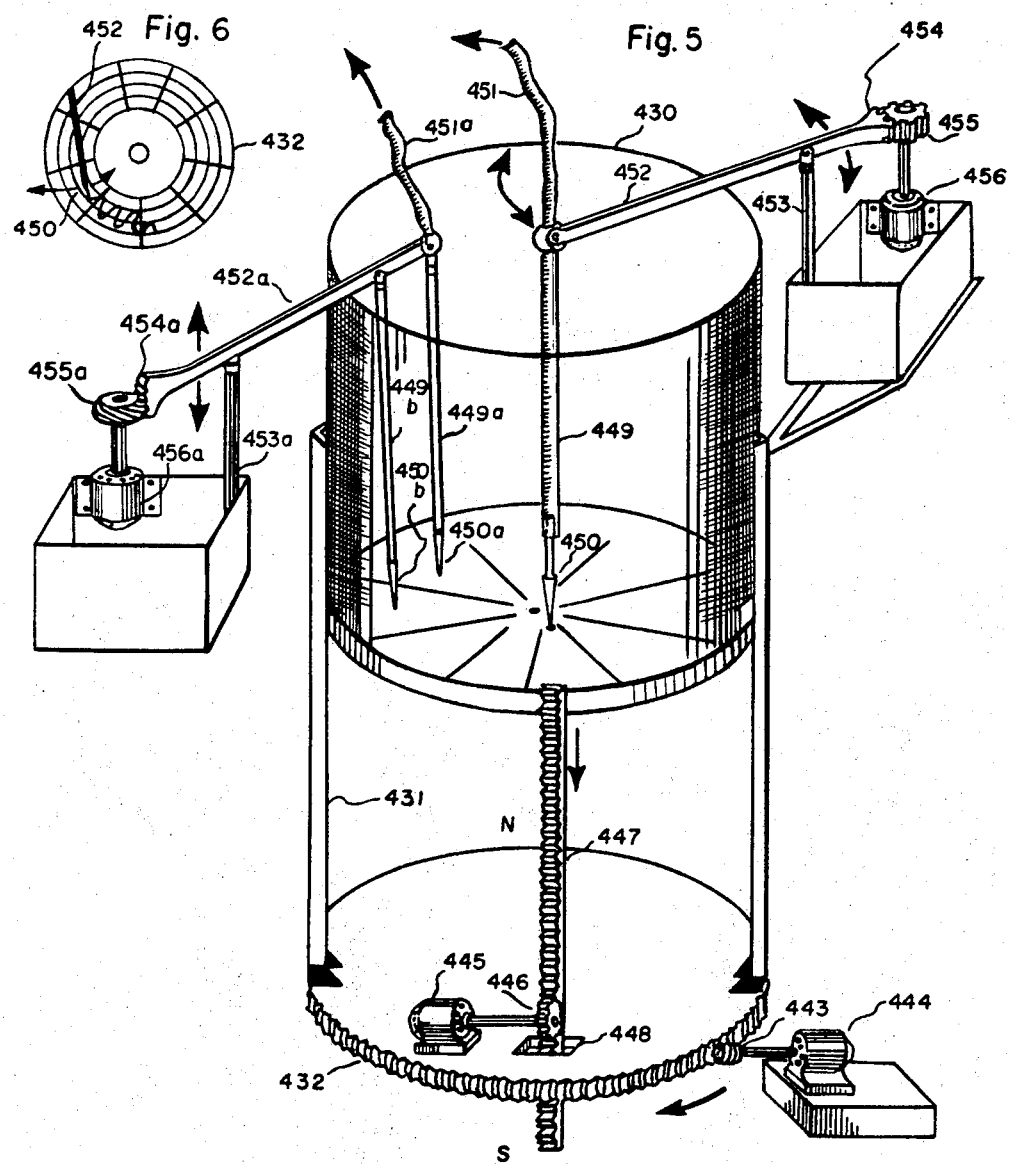

United States Patent Office 3,405,213
Patented Oct. 8, 1968

3,405,213
METHOD FOR THREE-DIMENSIONAL IMPRINT-
ING A THERMOPLASTIC OBJECT
Otto John Munz, Rte. 3, Box 1615–A,
Annapolis, Md. 21401
Continuation-in-part of applications Ser. No. 199,199,
Dec. 5, 1950; Ser. No. 228,180, May 25, 1951; and
Ser. No. 560,847, Jan. 23, 1956. This application
Jan. 30, 1956, Ser. No. 562,134
1 Claim. (Cl. 264—245)

ABSTRACT OF THE DISCLOSURE

A method for three-dimensional imprinting of a thermoplastic object comprising the steps of penetrating the surface of the object with a needle, depositing ink-type material into the penetration, sealing the penetration, thereby embedding the ink-type material within it.

Summary of the invention

This invention relates to apparatus for and method of making three-dimensional permanent or transient traces, such as writings, paintings, recordings, representations and similar markings, hereinafter called glyphs, within a container, hereinafter called glyph-matrix, filled with a transparent fluid, for visual inspection or other use.

References to prior applications

The present application was filed during copendency of U. S. patent applications; Ser. No. 199,199 for Glyph Recording, filed Dec. 5, 1950; Ser. No. 228,180 for Photo-Glyph Recording, filed May 25, 1951, now U. S. Patent No. 2,775,758, granted Dec. 25, 1956; and Ser. No. 560,847 for Linear Motor Control, filed Jan. 23, 1956, now U.S. Pat. No. 2,911,538, granted Nov. 3, 1959, as a continuation-in-part thereof, and the benefits of these prior filing dates are claimed for all common subject matter in accordance with 35 USC 120.

The present invention in particular relates to the glyph-container-matrix, to the styli means required for glyph production, to the various fluids supporting the styli and the glyphs in the matrix, hereinafter called glyph carriers, to the actual means which create the glyph, hereinafter called glyph forming medium, to the housings for matrixes and to various methods of producing glyphs.

The present invention is useful for instance for recording physical phenomena, which can advantageously be represented in space in the shape of three-dimensional bodies, curves and other markings, relative to a frame of references. Recording devices are known, which provide a continuously drawn written record of the variations of temperature, pressure, volume delivery, ratio of delivered volumes, current voltage or wattage values, generated electromotive forces, and the like, with respect to the control of a particular physical, electrical, chemical or mechanical operation. The use of circular or rectangular graphical charts for recording control data in semi-automatic or automatic operations in industry is well known. Generally, in each of these uses, there is employed a conventional phenomena—sensing means or detector for determining with respect to a standardized set of coordinates, in which the units of interest are indicated, variations of the particular physical force which is being measured. The variations usually are recorded by an indicating device actuated through a cooperating mechanism from the sensing means to provide a record of the variations of the physical condition in time.

Prior art

Heretofore, recording has been technically limited to recording equipment for scribing the record in two dimensions on a surface or chart. In view of the introduction of a recording container and of a record supporting mass in cooperation with the independent controls in each coordinate axis which are permitted by the apparata and methods of the present inventions, there are provided here advantageous unprecedented new results such as a three-dimensional body-record in a container-matrix.

The invention provide a stylus means which is actuated separately with respect to any of three or four sets of phenomena to produce a correlated body-record in space, which may be related to a set of three-dimensional coordinates in time or space. The number of variables which are used to move the stylus means of the present invention simultaneously is limited to three. Where certain of the forces are forces which themselves are compounded as a product of other forces, for example, momentum, torque, inertia and other physical phenomena, then additional forces beyond three may be measured with the system of the present invention. The variation of these compound forces in terms of some symbol single variable such as time, distance, pressure and the like, can serve as another sensing device which, through its actuating means, is operable to effect the independent movement of the stylus.

The principal object of the invention is to provide methods and apparata for the production of a glyph, diaglyph, a glyph-chart, a glyph-record, a glyph-plot, a photo-glyph, a glyph-sketch, a glyph-drawing, a glyph-design, glyph-print, a glyph painting, a teleglyph and similar as a three-dimensional counterpart of a graph, diagram, tabulated information chart, graphical record, graphical plot, photograph, sketch, drawing, design, print, painting, or television respectively.

Another object of the present invention is to provide a method of and apparatus for display of information such as values of mathematical functions or relative positions of physical objects in a transient form in three dimensions by the positioning of a stylus relative to three orthogonal reference axes.

Still another object of the present invention is to provide a method for continuous glyph-recording of information in a transient or in a more or less permanent form in three dimensions by a stylus leaving traces of its movements in a glyph record carrier for instance within a transparent container.

Yet another object of the present invention is to provide a recording method in a manner enabling the reading of the components of the glyph information in three dimensions by incorporating fiduciary marks, grids, references, graduations or other units significant of the objects displayed or represented.

Another object of the invention is to add to the above glyph display indicia of still another function, the units of which are representative of a fourth dimension such as of time or of other variables, which may be time or position dependent. The addition of a fourth variable to the three-dimensional display allows indication of functions of four variables such as the space-time equations of the Einstein special relativity theory.

Another object of the invention is to provide novel apparatus, methods and operating means for the production of three-dimensional permanent or transient recordings which utilize a recording assembly including a matrix-housing therefor, a recording carrier and a recording stylus universally movable therein, responsive to actuating means from devices for the sensing of phenomena and which apparatus and method of operation is capable of providing a record in three dimensions, which optionally may be related to a frame of references to determine the quantitative and qualitative characteristics of the phenomena sensed.

A further object of the invention is to obtain a permanent glyph-record by providing novel recording means, either manually controllable or controllable through the employment of magnetic, electromagnetic or electro-static forces to produce controlled levitating movements of a stylus within a recording medium, said stylus optionally provided with ink recording storage means which is capable of delivering ink to mark the medium while the stylus is moving.

Another object of the invention is to provide an assembly, including a matrix and a stylus movable therein, said matrix charged with a suitable carrier and said stylus equipped with glyph forming means, and means to move the stylus controllably within the matrix and to release its glyph forming means in its path to produce in cooperation with said carrier a fluorescent, phosphorescent or otherwise visible trace.

Another object of the invention is the provision of a manually controllable stylus.

Another object of the invention is the selection of suitable carriers and glyph forming media.

Another object of the invention is to provide a stylus with an ink-reservoir cartridge charged with a propellant to expell the ink under control.

Another object of the invention is the provision of a stylus-pen equipped with a propellant-charged ink in the form of a replaceable ink-reservoir, and with manual means to control the discharge output.

An object of the invention is to provide a graduated matrix charged with a transparent carrier and having means to introduce therein controllably a glyph forming means.

Another object of the invention is the provision of a transparent matrix charged with a transparent carrier and including at least one universally movable stylus equipped with glyph-forming means.

Another object of the invention is the provision of an expansible contractible matrix-cartridge which may be replaceably used within a glyph-housing equipped with stylus means.

Other and further objects will become apparent from the more detailed description and the drawings which are set forth in the application, it being understood that such further description and illustration is not limiting, since various changes may be made in the structures, methods and apparatus of the present invention by those skilled in the art without departing from the spirit and the scope of the present invention.

In the drawings:

FIG. 1 is a perspective view of a manually operated glyph apparatus.

FIG. 2 is an exploded perspective view of a manually operated stylus.

FIG. 2a and 2b are the top and side views respectively to an enlarged scale, of the nib of the stylus shown in FIG. 2.

FIG. 5 is a perspective view of a glyph recording apparatus for charting a plurality of associated phenomena.

FIG. 6 is top plan view to a reduced scale, of the apparatus shown in FIG. 5.

Figure 3:
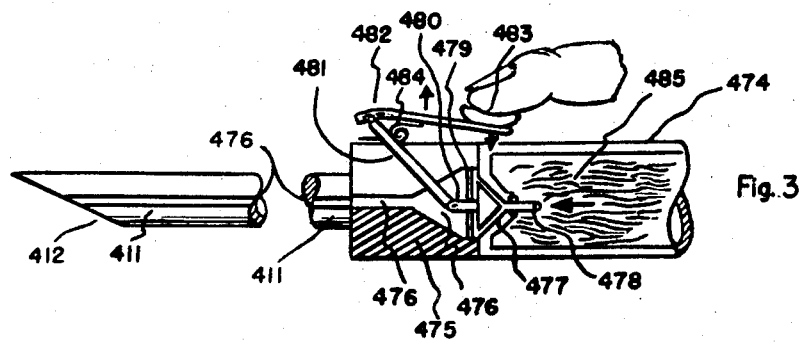
FIG. 3 is a view in vertical cross-section of a manually operated stylus equipped with a pressurized ink container and needle valve flow control.

For purposes of developing an explanation of the principles of the present invention, reference is made to FIGURE 1 in which a manually operable recording apparatus is shown. Outer housing 401 is provided at its top with a stylus guide, said guide comprising a slotted slide 402, capable of sliding along the x-axis over the upper edge of the housing and a horizontal slide 403, adapted to slide along the y-axis over the upper edge of the x-slide. In the center of the two slides there is provided an orifice 404 within which a stylus 405 is mounted to be slidably movable along the z-axis, x-axis and y-axis simultaneously.

In FIGURE 2 a manually operable stylus is shown having an asperating bulb 408, within which an inner valve 409 is provided to permit ingress of air. When the bulb 408 is squeezed, it expels ink from the ink container 410. The ink container is removably fitted to the bulb 408 and a graduated end portion of the stylus 411 is provided in order to indicate the depth of the stylus within the housing along the z-axis. This graduated end portion fits slidably into the housing orifice 404.

If desired, an optional construction of the stylus provides a stylus-nib 412 and additional means 417 to control the size of the orifice, specifically illustrated in the figure as a fore-finger slider.

As shown in FIGS. 2a and 2b, the nib is tapered and optionally provided with a cap 413.

The cap 413 extends over the orifice into a yoke 414 and is hinged at 415 to the upper end of the stylus. The yoke of the cap is hinged to the fore-finger slider 417 by means of rod 419. The rod 419 is anchored to the top of graduated end portion of the stylus 411. By use of the arrangement of the fore-finger slider, release of ink from container 410 may be controlled by simple manual pressure, sliding tab 417 back and forth.

The cap is automatically closed by a spring loaded device 416 on the hinge 415. An increase in pressure releases a proportionally greater quantity of ink.

To fill the ink container, ink may be drawn in manually by the asperating bulb or a replaceable cartridge may be introduced, provided with soft plastic material at its ends. If the cartridge of soft plastic material is employed, it is cut open at each end while being inserted, by the two sharp shanks, of the bulb and of the stylus, respectively.

The yoke of the cap at 416 is spring loaded to close the cap when not used. Upon operation of the forefinger tap 410, the yoke is disengaged.

In FIGURE 3 a squirt-type stylus is shown. The recording medium, such as ink, is enclosed in a pressurized flexible plastic cartridge, together with a highly volatile organic fluid propellant. The propellant may contain a non-ionic synthetic surface active wetting agent which foams in a water solution and assists recording. Such agents are cited for instance in U.S. Patents 2,524,590, 2,435,682, 2,659,704, 2,639,213, and may be employed with various inks and paints. The composition of inks, pigments, paints or other recording media of the liquid type may be blended with a propellant such as fluorine, chloro-fluorine, methane, ethyl chloride, dichlordifluor ethane, propane, freon acetylene, and the like, which develop fluid pressure to squirt out the ink through a valve controlled orifice.

The stylus of FIGURE 3 is manually controlled. It has a casing 474, having an extension 411 ending with a nib 412. The extension 411 connects by channel 476 with the front interior of the casing 475, and ends in a valve seat 477 comprising a tubular knife 478. The interior of the casing provides a housing for a slidable cone like valve 479, cooperating with valve seat 477. The valve has an extension 480 hinged to arm 481 protruding through casing by a tight fit to slide under lever 482 ending in a fore-finger tap 483. The lever is loaded by spring 484 to return the valve to closed position upon release of pressure by forefinger on tap. The cartridge 485 is cut open by being inserted into the casing under pressure against the tubular knife 478.

The type of stylus which is illustrated in FIG. 3 may be operated except for the presence of the additional forefinger control freehand in the same manner as a fountain pen, and it may be used for such a purpose without the stylus guiding means.

Returning now to FIGURE 1, means are provided, not shown, to open the skeleton of the housing and to permit the insertion and taking out of the container-matrix 406. The nib 412 is mounted for universal movements within the container along three coordinate axes by the slides as discussed above. Simultaneously or in the alternative, the nib may be mounted for movements along the polar coordinates by using a disc 407 which is fixed and centered over the orifice and provided with a ball bearing orifice 404a. The disc carries a horizontal graduation, and a vertical sector rotating over it for stylus alignment in the vertical directions. There may also be inserted through the orifices 404 the necessary means for filling the container.

The housing may optionally be provided with an orthogonal or polar set of coordinate references, and solar directions references upon the outer sides of the housing to idnetify location and quantity with respect to the physical phenomena being recorded in the medium.

As indicated in FIG. 1, the stylus itself is of a length which permits its nib to be inserted within the matrix to reach into the bottom corners of the matrix. Indentations may also be provided on the stylus to facilitate sliding positioning thereof along its graduated marks. A spring in the orifice 404 may be inserted to exert pressure against the indentation and to retard the sliding movement when a locked position is desired.

In the manner shown above, complete manual control of the stylus along orthogonal and/or polar coordinates may be achieved.

Figure 4:
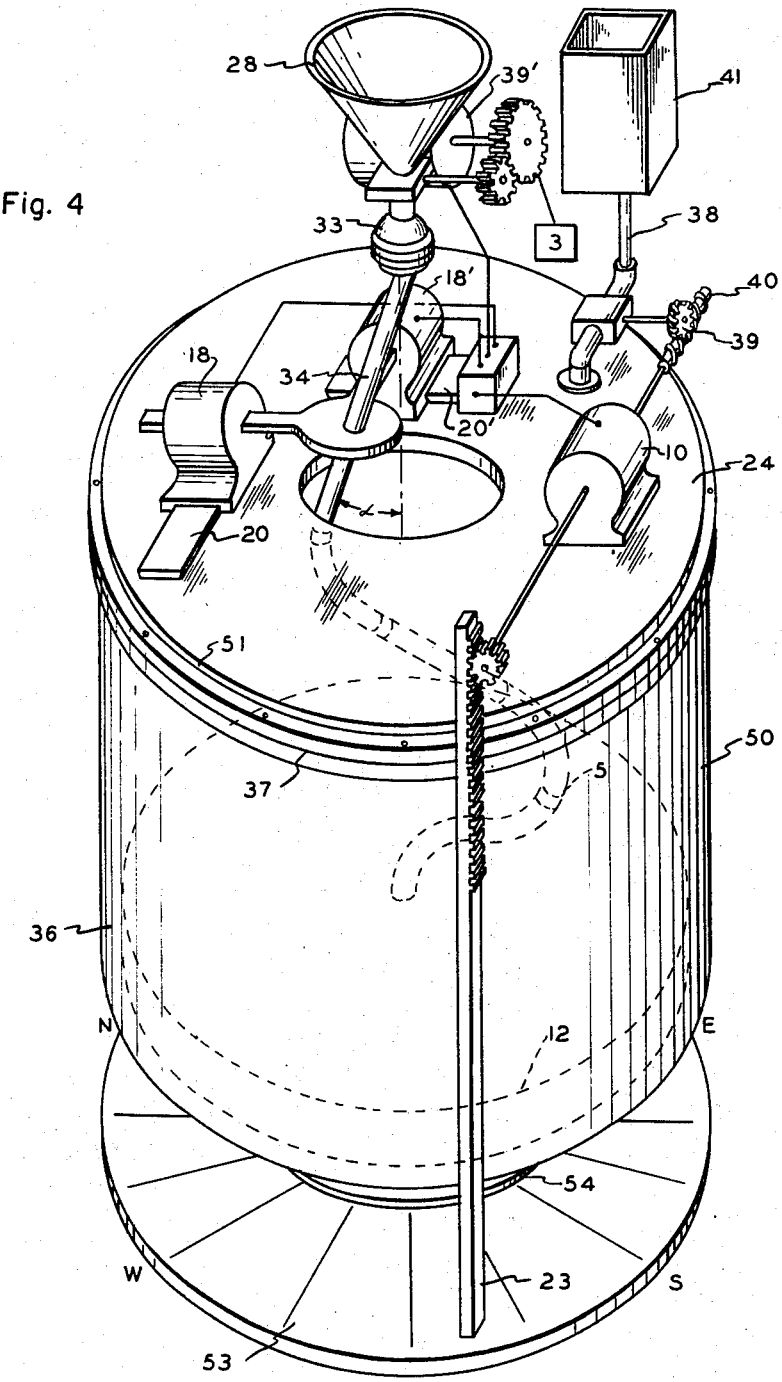
FIG. 4 is a perspective view of a mechanically operated glyph apparatus.

In FIG. 4 there is illustrated an arrangement for recording in an expansible container which is capable of either manual or automatic mechanical operation.

FIG. 4 illustrates another apparatus for performing the method of the invention. This apparatus also employs a glyph carrier in the recording space 50 to support the glyph record. The glyph recording elements are mounted on a fixed table frame 24. To this table is removably attached a cylinder-matrix 36, which is preferably transparent and which defines the recording space 50. The cylinder-matrix has a bottom slidable therein. In the cylinder moves a tightly fitting piston 12, adjacent to the cylinder bottom. The piston is controlled by control 10 through rack 23. A piston support 54 is shown movably connected to the table frame 24 by rack 23. At the start of the recording the piston is positioned in close proximity with the table frame and during the recording process it moves axially away from it. As it moves, it forms within the cylinder an expanding matrix. One or more glyph carriers stored in one or more tanks 41 are admitted to the matrix through inlet 38 controlled by a valve system 39 which in turn is controlled by the control 10. The control 10 simultaneously controls the expansion by piston and serves to keep the expanding matrix filled with the carrier. The recording head is shown here as a tube 34 movably connected to a universal joint 33. The material from which the glyph is to be formed is advanced from one or more funnels 28 through a valve system 39' controlled by an electric motor output 3 such as a synchro. A phenomenon detector provides electric input to the motor 3 which in turn will cause an opening or closing of the valve. The tube 34 is controlled by two other phenomena translators, such as servo-motors 18 and 18' and forms the material into a glyph by positioning it relative to a frame of references appended to the matrix. If the glyph cannot support itself, a transparent supporting mass is admitted into the matrix through valve mechanism 39. There may be a plurality of glyph-supporting masses stored in a plurality of tanks 41, the mass in each tank for instance having a different color transparency. Thus a sequence of variously colored transparent layers may be superimposed in a predetermined sequence, indicative for instance of time, or variegated heat-conditions, altitude changes, etc.

There may be a plurality of funnels 28, each dispensing a different glyph forming medium or material. Thus again different markings of the glyph record may be accomplished, indicative of time, quantity, quality, condition or other phenomena desired to be included in the glyph-record.

FIGURES 5 and 6 show a glyph-recording apparatus of the type employing a rotating record chart type carrier with the stylus moving from center to periphery and back. The present invention substitutes for the two-dimensional paper chart a three-dimensional matrix in the shape of container 430, filled with a transparent carrier to support the glyph. The matrix is vertically slidable in a glyph-housing 431, having a turntable base 432, provided on the periphery with teeth, meshing with wormgear 443 of motor 444. On the base is mounted a vertical motor control of the matrix, shown by motor 445 engaging by gear 446 rack 447. The rack recedes downward through opening 448 in base, thus permitting the matrix to slide downwards away from the recording stylus 449. The stylus comprises a vertical ink-dispensing rigid tube portion ending in a nib 450, which at the beginning of recording is positioned at the bottom of the matrix. On the opposite side the stylus extends through a flexible pipe 451 into an ink reservoir, which may be equipped with a valve system permitting control over the supply of ink to the stylus. The rigid portion of the stylus is rigidly mounted to a horizontal arm 452 mounted on pivot 453 actuated by horizontal toothed segment 454 for reciprocating movements between the periphery of the matrix and near center. The segment 454 engages the gear 455 of the vertical axis motor 456, which is reversible. The glyph recording is produced by the relative movements between the rotating receiding matrix and the reciprocating stylus as the stylus discharges an ink trace into the transparent carrier. A vertical reference information may be simultaneously recorded by a second vertical stylus in analogy to that already shown as 449, except that the second stylus is centered in the matrix, has no reciprocating movements and has its flow of ink periodically interrupted to provide vertical graduation marks. A horizontal reference system may be drawn into the carrier by one or more additional styli, shown as 449a and 449b, which are constructed similarly to stylus 449, having nibs 450a and 450b and a connection to ink reservoir by tube 451a. While the matrix recedes, the dispensing styli 449a and 449b follow its downward movements, being lowered at the same rate of speed by reciprocating motor (456)(a) through worm gear 455a, which engages vertical segment gear 454a on arm 452a over pivot 453a. Upon completion of one turn of the turntable 432, the ink supply to 451a is disconnected, the styli 449a and 449b are pulled up into a predetermined higher recording position, the ink supply is again turned on and the styli are dispensing ink for another complete rotation. Thus during each recording rotation, the styli 459a and 459b each draws complete circles within the matrix at a sequence of levels predetermined as a graduation in a horizontal frame of references.

The matrix may have any desirable shape, such as a polyhedron, prism, pyramid, cone, plinth, double curved or warped surface, or cylinder. Graduations and index flaps along each coordinate axis, or any symbols providing a frame of references to guide in the production and or in the interpretation of the glyph may be drawn, printed, or affixed to or within the matrix itself.

A frame of references may be provided by incorporating into or adjacent to the matrix back-ground information for instance in the form of a three-dimensional relief map, such as a previously produced "photo-glyph" described in the above cited copending patent application of the same name.

The walls of the matrix are preferably made of transparent glass, or hardened plastic such as methyl methacrylate.

In another embodiment of the invention, the matrix is made of a transparent high-density selfsealing plastic permitting penetration by a sharp glyph-stylus, such as equipped with a hypodermic needle. When the needle is withdrawn after deposition of a glyph forming medium in the glyph-carrier, the matrix wall reseals itself without deformation. High-density, selfsupporting, selfsealing plastics such as plasticized Butyl rubber, transparent chlorinated rubber, or poly-iso-butylene of a molecular weight less than 100,000 are suitable for this purpose.

A glyph carrier to support the record in the container in one of its simplest forms, is pharmaceutical gelatine. A glyph carrier during glyph-production must be sufficiently fluid to permit movements of a stylus within it. The glyph carrier may be solidfied during or after completion of the glyph, to freeze the glyph therein into a permanent record by methods well known to the art.

Another example of a glyph carrier is an organic polymer formed from difunctional unit such as vinyl acetate, or styrene workable at 125° C. At room temperature it is tough, but still sufficiently soft and plastic to be useful in glyph production. It will yield to stylus movements under a continuous force which is stronger than its shear resistance.

Other examples of materials which meet the requirements upon glyph carriers in accordance with this embodiment of the invention, namely, which have light transmitting properties and which are changeable from fluid to solid state with controllable intermediate viscosities are naturally occurring substances such as:

Gum arabic, rosins, low-melting waxes.

Synthetic materials such as:

Commarone indene resin, hydrogenated commarone indene resins, and commarone indene resins modified, for instance, with phenol or with cresylic acid. Alcohol soluble terpine resins.

Vinyl resins

Vinyl butyrate resins soluble in alcohol, vinyl chloride resins soluble in ketones and esters, vinyl chloride acetate resins.

Methyl metacrylate polymer soluble in ketones, esters and aromatic hydrocarbons.

Polystyrene and styrene co-polymers soluble in aromatic and chlorinated hydrocarbons.

Resins from rosins, sols.

Gels such as gelatin, polyvinyl alcohol, silica gels.

Silicone polymers.

The viscosities of the glyph carriers are controlled by well known methods either in accordance with their respective thermo-plastic, the thermo-setting, or coagulating properties or by organic solvents. The above materials are commercially available with the desirable properties with respect to light transmission, viscosity, cone penetration, needle penetration, and ductility in accordance to the standards of the American Society for Testing Materials. Thus materials best suitable for particular purposes desired may be selected to meet the requirements of specific cases from a wide variety of available known commercial products. In some instances the viscosity of the glyph carrier preferably is controlled to cooperate also with the movements of the stylus shown in the embodiment of the invention of FIGURE 7. Thus during glyph-formation viscosity of the glyph carriers may be selected simultaneously to function as a controllable damping medium and interference to the speed of the stylus movements.

In an alternative embodiment of the invention one species of the matrix described above as having walls made of high density selfsupporting poly-iso-butylene may be combined with a glyph carrier of the same material in one body. This is preferable, for instance, when the glyph production is to be achieved by the insertion of small bodies such as markers in a specific glyph-configurations.

In such an instance the walls are made of poly-iso-butylene of a self-supporting molecular weight 100,000 the interior, however, while of the same elastomeric transparent material will have a molecular weight, for instance, of 25,000 up, that is non-supporting by itself, however, is still capable of supporting a glyph forming medium.

The quality of the material necessary to permit penetration depends on the thickness of the wall, on the sharpness of the stylus point, on the elasticibility of the material, that is on its capability to recover from distortion or deformation caused by the stylus and to return to its original shape.

A hardness of the matrix wall and of the glyph carrier below 1 of the Mohs hardness scale is suitable when the stylus point has the conventional dimension of any size hypodermic needle.

The optimum hardness should be determined experimentally in each case.

The poly-iso-butylene matrix and glyph carriers are preferable also when it is desired to use a sharp pointed measuring stick to evaluate the completed glyph, or if the location of the glyph forming medium is to be changed or it should be withdrawn. In the latter instance magnetized or permeable glyph forming particles are preferable, so that they may be withdrawn by a stylus with a magnetic point, or by electro-magnetic forces.

It is known to the art of rheology that the viscosity of certain fluids, such as of silicones, may be increased to a point where its character is non-Newtonian and where the liquid will keep a body fixed in space, independently of its buoyancy, and of its motional forces, which are lesser than the shearing stresses of the liquid. Thus the body will move in response to a force only, which is greater than the shear resistance of the supporting viscous liquid.

In a book by Robert Roy McGregor on, "Silicones and Their Use," Melon Institute, Pittsburgh, Pa., pp. 203 1, 4, there are described such effects of viscosity with reference to silicones. Utilizing the shearing stress resistance of these plastics the movements of the stylus in the embodiment of the invention shown in FIG. 7 may be damped and controlled by controlling the viscosity of the carrier. The viscosity of thermoplastic carriers may be controlled by incorporating into the glyph matrix housing temperature control means. Some other plastics may have their viscosity controlled by solvents, etc., in manners specific to the plastic selected, by means well known to the art.

The glyph-producing medium may be chosen from various materials, compatible with the carrier selected. It may be a physical body, such as a web, wire, dust particles, pigments, permeable or magnetic particles, inks, paints, materials reacting or combining with the carrier selected chemically, thermally or optically or any other substance capable of leaving a visible trace, including a light ray to expose a photo-sensitive carrier.

In the selection care must be taken that the molecular weight of the glyph-forming medium equals that of the glyph carrier during application. When a water soluble carrier is used, the glyph forming medium preferably will be either water non-soluble to prevent spreading within the carrier, or it will be dispensed in minute quantities, just sufficient to leave the required trace, while spread. The viscosity of the carrier must be sufficiently high to retain the glyph-forming medium in the position into which it has been put. The same material which is selected as a glyph carrier in a transparent state, colored as a rule is suitable as a glyph forming medium in it. Other materials suitable as glyph forming media are, for instance: vinyl resins with plasticizers, acrylics, dyes, India ink.

The molecular weight, the surface tension, the wetting properties and the viscosity of the glyph carrier and of the glyph forming means are selected to cooperate.

The ink compositions which preferably are used in the stylus of the present invention are in general, emulsions containing an inorganic pigment or an organic insoluble dye stuff, which is suspended in an oil phase, but which pigment or dye stuff, insoluble inorganic pigment or insoluble organic dye stuff, is treated with a stabilizing agent in an aqueous solution to leave a residue of stabilizing film thereon. As an example, utilizing a white pigment such as titanium dioxide, an anionic wetting agent such as a high molecular weight poly-glycol ether of a polyhedric alcohol such as sorbitol may be used. Another effective anionic wetting agent which may be used is the condensation part resulting from the addition of 10 to 12 moles of ethylene oxide to a molecule of dodecyl alcohol.

This same wetting function is obtained from complex compounds of the Werner type, in which trivalent nuclear chromium atoms are coordinated with organic acido groups. These compounds, as shown in U.S. Patent No. 2,544,668, particularly when mixed with a small amount of an emulsion of a polyester, provide a desirable protective film to aid dispersion of the pigment and at the same time prevent bleeding of the color in the areas which have been indicated in the three-dimensional product.

The oil phase preferably comprises a mixture of higher molecular weight fatty acid esters, or saturated fatty acid esters, such as ethyl or methyl stearate, ethyl laurate, butyl laurate, and the like, to which is added a thickening agent and a non-compatibilizing agent such as ethylene glycol, or liquid poly-glycols which are polymers of ethylene glycol, propylene, etc. These glycols which are aliphatic in nature serve the function of preventing the bleeding of the pigment and oil into the solid polymeric matrix.

The proportion of the glycol which is used depends upon the nature of the carrier. Where the carrier is a polymer or copolymer of an unsaturated polymerizable monomer such as methyl metacrylate and a polyester, a higher proportion of the glycol is used whereas with gelatin, a higher proportion of the oil is used. With gelatin about 80% of oil is used. For the synthetic polymer, about 50% of the oil phase is the glycol. The thickener may be carboxymethylcellulose, natural resins and gums, Irish moss, kaolin. Preferably about 5% of a thickener may be used.

Thus the properties of the carrier and of the glyph forming means respectively must be considered in their selection, so that the ink does not contract into globules, or does not sink, or float, or spreads within the carrier by physical dispersion or chemical reaction.

Into a matrix filled with a glyph carrier of the solidifiable type glyph traces are introduced by any of the methods herein elsewhere described by using a colloidal suspension of fine ferro-magnetic or high-dielectric particles for instance in a silicone oil. By subjecting the suspension to magnetic or electric fields, until the glyph carrier solidifies, the viscosity and shear resistance of the suspension is converted into an almost solid state. After solidification the cutting off of the magnetic or electric field releases the suspension to its fluid state, making it posisble to drain it from the solidified body. This is a novel alternative to the "lost wax method," and an improvement over it, since the hollow channels do not need to be premade, but may be the result of recording a plurality of transient phenomena.

A glyph may be created by forcing air or other gases, or foams through a glyph carrier in a continuous stream controllably origniated from a glyph stylus. In such an instance the glyph carrier must be of a viscosity sufficiently high and of an ability to solidify sufficiently fast to retain the air forced therein in its original location. By these methods a hollow glyph trace can be created within the matrix, to function later as a three-dimensional glyph circuitry, if filled with electro-conductive material, or as a three-dimensional electronic tube, or for other purposes.

The apparatus shown in FIG. 14 illustrates another possibility of carrying out the method of the present invention. It shows a horizontal method of recording although it is not restricted to such. This apparatus is primarily designed for the recording of continuous phenomena together with interrelated occasional phenomena. The glyph-forming head uses a gimbal mechanism mounted in frame 49, capable of universal movements within the limits of the recording space. The outer gimbal ring 47, controlled by servomotor 48 is mounted for angular movements about a horizontal axis, and the inner gimbal ring 47', controlled by servomotor 48', is mounted for movements about a vertical axis. The servomotors shown are of the electro-magnetic rotor-stator type. The servomotor 48' is mounted on the outer gimbal ring 47 and moves with it. The inner gimbal ring 47' has a central opening through which the web 21 proceeds and where it is deviated horizontally and vertically by the combined action of the two gimbal rings. The formed glyph is carried away from the recording head in the direction of the recording axis preferably by carrier 9, at a speed controlled by rack 23 through carrier control 10. The web is fabricated during recording in the form of a transparent tube by an extruder 30, receiving the glyph-forming material from one or more funnels 28 and controlled by material-advance control 31. The extruder is positioned in preheating coils 29. The plasticized material is extruded into a tubular chamber 42, the inner walls of which are defined by a die 43, threaded into the frame of the apparatus 24, to form a tube. Said die is centered within the tubular channel and has a central bore 44 connected by a tube to phenomena propagating mechanism, such as an extruder, pump, injector or equivalent, indicated by numeral 45. Such a mechanism may have its own material advance control, starting with a funnel 28' and continuing with features substantially as described above with reference to numeral 28 in FIGURE 4. Each of the main recording elements, that is the carrier, the two gimbal controls, the tubular extruder, and the mechanism 45 are actuated by separate servos 3, and the motion of some of these elements may be synchronized at 11, if necessary. The occasional phenomenon to be recorded is connected through its servo with the injection apparatus 45. The chamber 42 may be positioned within a coil 41 which circulates a medium for fixing the formed tube before recording such as precooling through inlet 38. The glyph material is advanced in a plasticized state through the extruder 30 to form the transparent glyph-web in the form of a tube. The tube, precooled by cooling coils 41, retains a deformability sufficient to yield to the shaping deviations of the gimbal system. Simultaneously, the mechanism 45, which is controlled by another servomotor, occasionally injects or extrudes into the tube through conduit 44 another material sufficiently dark to make it visible against the transparent tube. The continuous glyph together with its inside record is then carried away by the carrier into the recording space. Thus additional phenomena may be recorded simultaneously for correlation with one another. Also, several recording heads may record simultaneously in the same recording space side by side or along parallel axes. The cross section of the glyph may be of any desirable form, size or shape. Means may be incorporated to change the cross section during recording in response to variable phenomena.

The apparatus 45 in FIG. 14 may be an acoustic source, propagating sound vibrations or compression waves through the tube. The beginning of the tube optionally may be sealed off. Normally, the carrier 9 has a central opening, keeping the orifice of the tube open. Sound vibrations or compression waves initiated at 45 pass through the tube, leaving reliefs on its inner and outer surfaces while the tube is still in a plastic condition during precooling at 41. Thus the tube surface constitutes a record of sound vibrations standing or moving or of compression waves passing therethrough. The gimbals may remain inactive or may be eliminated entirely. Such recording is useful also in a novel sound investigation and in supersonic research.

Circuit printing electro-conductive paints, or webs may be used to produce three-dimensional electrical networks, whereby the glyph carrier is to be selected with electricity insulating properties. By using the glyph method for printing three-dimensional electric circuits, otherwise inaccessible, critical interior leads may be created.

The apparata of FIGS. 1, 4, 5 are useful for the optical and photographic recording by virtue of the fact that the recording medium may be a photographic or photosensitive emulsion. Such emulsions are not limited to silver halide emulsions and there may be employed instead, for example, synthetic resins which are known to be photosensitive and which will leave a trace after they are converted from a fluid state to a completely hardened state. An example of such emulsion is a copolymer of a polyester such as that obtained from a polybasic acid and a polyhedric alcohol, with a polymerizable vinyl derivative such as styrene, vinyl acetate or the like. These materials, as shown in U.S. Patent 2,673,151 dated Mar. 23, 1954, may be sensitized with certain sulphur sensitizers. In the presence of these sensitizers such as tetramethyl thiuram tetrasulphide, and a catalyst for the polymerization of the mixture of monomer materials, such as tertiary butyl hydro-peroxide, the resin assumes a hardened thermoset state in which it is highly durable and insoluble at the portions where it is struck by light.

In accordance with the present invention, the light sensitizer, the sulphide material, is traced by the stylus after it is emitted therefrom. The entire container is exposed to strong light, such as light from a carbon arc or sunlight, and after five minutes to one hour, there is a hardening of the resin which is observed in the areas where the sensitizer has been emitted by the stylus. After baking for a short time to gel the resin, the unhardened portions can be washed away and there is obtained a relief image of the trace of the stylus.

By employing an ink or coloring material with the sensitizer, there may be obtained colored effects to outline in greater detail the portions which have been scribed in three dimensions. Alternatively, if it is not desired to produce the relief effect mentioned in the previous paragraph, the use of the dye in combination with the sensitizer permits an after-baking of the gelled resin in the matrix at temperatures of about 250° F. for one-half hour during which time the product is cured to a hard, plastic body. Since the product itself is transparent and the scribed materials are not transparent, there is obtained thereby a permanent record in three dimensions.

In similar manner, other plastic materials may be employed. For example, as shown in U.S. Patent 2,687,958, polyacrylic acid amide may be hardened by the action of light in sensitized areas containing 4,4′ diazo, 2,2′ stilbene disulformic acid. A further example are products prepared from polyvinyl alcohol such as shown in Minsk patents U.S. 2,610,120, 2,670,285, 2,670,286, 2,670,287 and Martinson patent U.S. 2,697,039.

The above compositions are sensitized with cinnamic acid esters and which may be further sensitized with quinones, anthrones, and triphenolmethane compounds.

The value of these polyvinyl alcohol modified materials as described in the previous paragraph is that the material may become ink repellant in the presence of moisture by treatment with an aqueous oxidizing agent like potassium permanganate and or the exposed portions may be given a controlled degree of water receptivity. Thus, advantage may be taken of the improved water receptivity of the exposed portions to use water soluble pigments or dyes which adhere preferentially to the water receptive areas. The ink receptive areas may be colored in a different color by using a greasy ink. In this way, it is possible to provide different colored areas simultaneously to bring out in greater detail the scribing of the record in three dimensions.

The present specification describes examples of the invention for the purposes of the disclosure. It is however, intended to cover all changes, modifications and combinations of the embodiments shown, and combinations of the present invention with those disclosed in the above cited copending patent applications, which do not depart from the spirit and scope of the invention as claimed.

I claim:

1. A method of imparting a color fast imprint to a non-porous surface of a thermoplastic polymeric object prepared from a polymer of a monomer containing a sole ethylenic unsaturation which comprises penetrating the surface of said object with a needle, depositing coloring matter into the resulting depression, and thereafter sealing said depression, there by embedding at least a portion of said coloring matter in the surface of said object.

References Cited

UNITED STATES PATENTS

| | | | |
|---|---|---|---|
| 2,535,674 | 12/1950 | Franklin | 339—17 |
| 2,604,607 | 7/1952 | Howell | 343—7.9 |
| 2,734,150 | 2/1956 | Beck | 339—17 |
| 2,911,538 | 11/1959 | Munz | 346—8 |
| 1,610,412 | 12/1926 | Balch | 346—8 |
| 2,246,871 | 6/1941 | Balch | 99—137 |
| 2,316,165 | 4/1943 | Howser | 99—139 |
| 1,595,801 | 8/1926 | McDonald | 346—8 |
| 2,691,306 | 10/1954 | Beams et al. | 346—8 |
| 1,589,039 | 6/1926 | Kaempfe | 308—10 |
| 2,543,793 | 3/1951 | Marks | 178—6.5 |
| 2,566,221 | 8/1951 | Lovell | 308—10 |
| 2,718,451 | 9/1955 | Tafel et al. | 346—136 |
| 2,760,840 | 8/1956 | Gordon | 346—8 |
| 445,944 | 2/1891 | Birkmire | 120—48 |
| 1,851,774 | 3/1932 | Rogers | 346—146 X |
| 2,628,539 | 2/1953 | De Neergaard | 346—49 X |
| 1,746,065 | 2/1930 | Van Sant | 120—51 X |
| 2,616,077 | 10/1952 | Holser | 343—5 |
| 2,628,881 | 2/1953 | Adams | 346—1 |
| 2,759,783 | 8/1956 | Ross | 346—8 |

FOREIGN PATENTS

| | | |
|---|---|---|
| 18,346 | 1901 | Great Britain. |
| 469,916 | 8/1937 | Great Britain. |

ROBERT F. WHITE, *Primary Examiner.*

A. R. NOE, *Assistant Examiner.*